(12) United States Patent
Eberle et al.

(10) Patent No.: US 8,550,219 B2
(45) Date of Patent: Oct. 8, 2013

(54) RECTANGULAR, ELECTROMAGNETICALLY RELEASING DUAL-CIRCUIT SPRING-PRESSURE BRAKE

(75) Inventors: Johann Eberle, Irsee (DE); Gunther Klingler, Oberostendorf (DE); Harald Weiss, Stottwang (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 787 days.

(21) Appl. No.: 12/225,941

(22) PCT Filed: Apr. 2, 2007

(86) PCT No.: PCT/EP2007/002963
§ 371 (c)(1),
(2), (4) Date: Oct. 2, 2008

(87) PCT Pub. No.: WO2007/115730
PCT Pub. Date: Oct. 18, 2007

(65) Prior Publication Data
US 2009/0166136 A1 Jul. 2, 2009

(30) Foreign Application Priority Data

Apr. 7, 2006 (DE) .......................... 10 2006 016 434

(51) Int. Cl.
*F16D 59/02* (2006.01)
*B60T 13/04* (2006.01)

(52) U.S. Cl.
USPC .............................. 188/171; 188/161; 310/77

(58) Field of Classification Search
USPC ............... 188/156, 171, 216, 72.9, 72.7, 187, 188/161, 163; 310/77, 93; 187/288, 359
See application file for complete search history.

(56) References Cited

U.S. PATENT DOCUMENTS

| 3,605,958 | A | | 9/1971 | McCarthy | |
|---|---|---|---|---|---|
| 4,515,251 | A | * | 5/1985 | Wruk ............................ | 188/171 |
| 6,536,563 | B1 | * | 3/2003 | Schlehbusch et al. ........ | 188/161 |
| 7,958,977 | B2 | * | 6/2011 | Klingler et al. ............... | 188/171 |
| 2004/0108177 | A1 | * | 6/2004 | Eberle et al. .................. | 188/163 |

FOREIGN PATENT DOCUMENTS

| DE | 3424595 A1 * | 1/1986 |
|---|---|---|
| DE | 3642013 A1 * | 6/1988 |

(Continued)

*Primary Examiner* — Anna Momper
(74) *Attorney, Agent, or Firm* — W. Norman Roth

(57) ABSTRACT

Disclosed is an electromagnetically released spring pressure brake that is to be mounted on a machine wall or similar. Said brake comprises a uniform rectangular coil support (1) with two preferably oval, adjacent coils (7, 7.1), to which two separately movable rectangular armature disks are assigned. Said armature disks apply pressure to a joint rotor encompassing two friction linings that are mounted on each side when the coils (7, 7.1) are de-energized. The rotor is axially movable on an axially toothed hub. Two respective fastening screws (9) are used for guiding each of the armature disks parallel along the central longitudinal axis (13, 13.1) thereof, on the radially largest possible diameter of the rotor. A manual lever (10) featuring manual releasing bolts is provided for each armature disk. The inventive brake is simple and inexpensive and has two separate braking circuits, allowing the friction surfaces to be better utilized as the rotor has a greater diameter while the outer dimensions of the brake remain the same. Alternatively, the outer dimensions can be reduced if the rotor is not modified. In order to do so, a uniform or monolithic square coil support is provided that comprises two adjacent coils therein and two separate, independently movable armature disks on both sides of the central brake rotor (3).

8 Claims, 5 Drawing Sheets

(56) References Cited

FOREIGN PATENT DOCUMENTS

| | | |
|---|---|---|
| DE | 19807654 A1 | 8/1999 |
| DE | 102005022898 A1 * | 11/2006 |
| EP | 1058021 A | 12/2000 |
| JP | 02150520 A * | 6/1990 |
| WO | WO 01/14164 A | 3/2001 |
| WO | WO 0159317 A1 * | 8/2001 |

* cited by examiner

RECTANGULAR, ELECTROMAGNETICALLY RELEASING DUAL-CIRCUIT SPRING-PRESSURE BRAKE

It has been known by applicant's own DE 19807654 to decelerate a rotating element such as a cable drum of an elevator installation by means of an electromagnetic spring-pressure brake acting at a peripheral location, on an inside surface or on one of the faces of the rotating element. The spring-pressure brake has an annular coil support accommodating a coil and a friction liner coupled with the armature disk via an intermediate disk member. The aforesaid document also describes the possibility of having e.g. two such brakes engage the rotating disk at diametrically opposite angular positions A and B, as described in claim 4 (FIG. 3).

DE 3400675 C2 discloses the possibility of providing the coil support accommodating the coil to be rectangular, not just circular.

WO 01/59317 A1 (Mayr) shows in FIG. 5 that in an electromagnetic spring-pressure brake, for example, the associated electromagnetic coil may come in two parts and in a kidney shape. An additional segmented armature disk results in a dual-circuit design and the use of as much of the available coil space as possible. Another possibility would be the incorporation of a so-called oval coil into a coil support.

In the given context, "dual circuit" refers to the presence of two separately operable brake sections whereby operational safety can be enhanced by one of the brake sections continuing to operate even if the other is disabled by malfunction.

The so-called sectioned brake of earlier filed but post-published application DE 10 2005 022 898 A1 comprises two independent brakes each with a rectangular body, an oval coil therein and an associated armature disk. With the coil de-energized, each armature disk is urged against the rotor commonly disposed between the two rectangular brakes, said rotor being axially movable on a splined hub. The dual-circuit nature of the brake operation is the result of two independent reactangular brakes being provided, each comprising a coil support housing with a coil therein and an armature disk. Additional embodiments disclosed in DE 10 2005 022 898 A1 show two or more separate independent spring-pressure brakes which act simultaneously on the rotor to be decelerated.

Starting from the aforesaid state of the art and the solution of said earlier filed application, it is the object of the present invention to provide a more simple and inexpensive dual-circuit brake which enables a better utilization of the friction surfaces to be obtained by way of a larger diameter of the rotor while the external brake dimensions are the same or, alternatively, by way of the same rotor size with the brake dimensions reduced, with fewer components assembled to form a compact structure and the unitary brake design simplifying the sealing or covering thereof.

In accordance with the invention, this object is achieved by providing—instead of two independent rectangular identical brakes engaging the rotor by their friction liners—a single integral rectangular coil support housing having a pair of—preferably oval—coils therein, as well as two separate associated armature disks each symmetrically placed on a pair of—from a total of four—threaded fasteners or bolts of the integral coil support housing to engage the rotor by the friction liners when the coils are de-energized. In the past, four threaded fasteners were needed, i.e. a total of eight, if two brakes were used. In accordance with the invention, only four fasteners are needed now and these are placed in radially further outward locations so that the friction radius and the torque are increased and the pressure acting on the friction liner reduced, with the external dimensions remaining the same. The pair of separate—preferably oval—coils and the associated, separately movable armature disks allow a dual-circuit operability of the brake to be obtained although only one coil support housing remains.

With only one unitary rectangular coil support remaining, it is easy to seal or cover the brake (by means of a rubber shroud or the like) for protection from foreign objects or dirt.

The attached drawings depict an embodiment example of the invention.

FIG. 1 shows a perspective view of the inventive integral coil support with a pair of oval coils therein, as shown in phatom in FIG. 2, and a pair of separate armature disks disposed on either side of the central rotor, with the armature disks each mounted symmetrically on only one pair of threaded fasteners and, with the coil de-energized, engaging the friction liners of the rotor mounted for axially movement on the splined hub;

Figure 1:
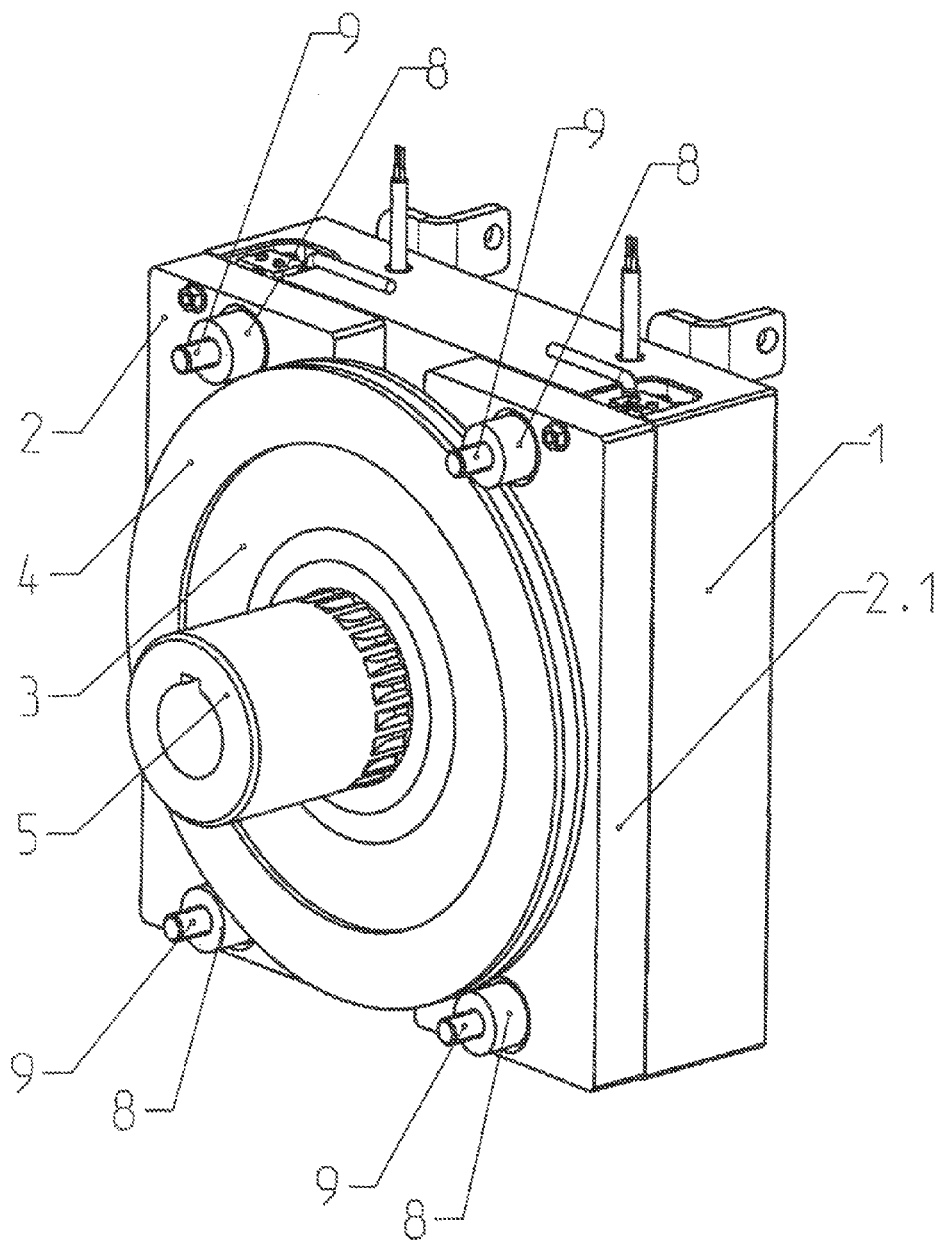

FIG. 1 is an axonometric view of the complete brake showing the integral coil support 1 with its square or rectangular housing and a pair of separately operating armature disks 2 and 2.1, with the—preferably oval—coils accommodated by the unitary coil support housing they magnetically interact with.

Rotor 3—with friction liners 4 adhesively bonded to both faces thereof—is mounted for axial movement on a toothed or splined hub 5. Four spacer sleeves 8, of which two receive the torque of an associated armature disk, are mounted on four threaded fasteners 9.

Figure 2:
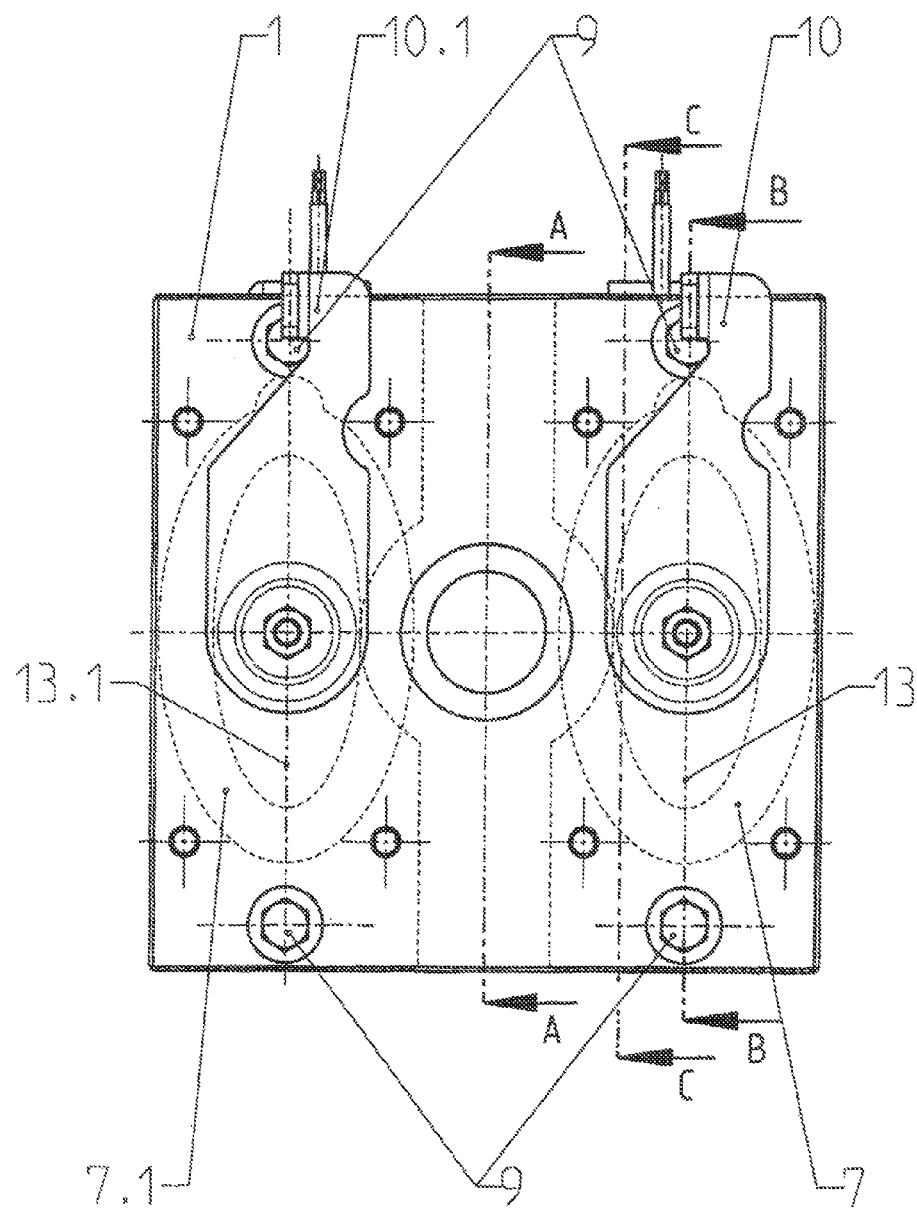
FIG. 2 shows a rear view of the inventive brake, with the position of the pair of oval coils inside the coil support housing shown in phantom.

FIG. 2 clearly shows the position of oval coils 7 and 7.1, which are potted in a side-by-side relationship in approximately the same plane inside the square or rectangular housing of coil support 1. The heads of the four threaded fasteners 9 can be seen on the rear surface of coil support 1 (see FIG. 2). In an emergency such as a power failure, it may be necessary to manually or mechanically release or disengage armature disks 2 and 2.1 from the friction liners 4 of rotor 3; to this end, a pair of manual release levers 10 and 10.1 are provided on the rear surface.

Figure 3:
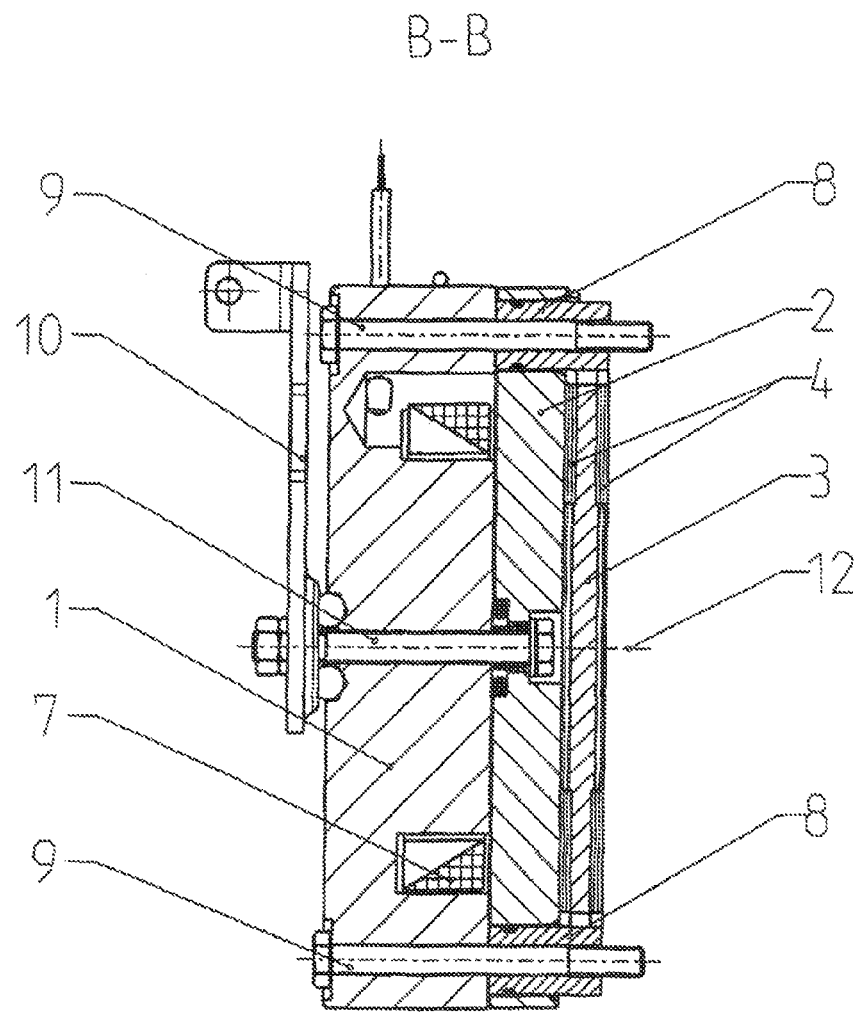
FIG. 3 is a section along line B-B of FIG. 2, showing the spring-pressure brake mounted on a machine wall (not shown) by means of the threaded fasteners and the manual release member for releasing the spring-pressure brake as the coil is de-energized.

FIG. 3 shows how threaded fasteners 9 and spacer sleeves 8 mounted thereon may be attached axially to a machine wall (not shown) on the right hand side of the assembly (seen in FIG. 3). Manual levers 10 each allow an armature disk 2 to be manually attracted axially to coil support 1 via an associated central bolt 11, thus releasing rotor 3 and its two friction liners 4 for continued rotation when the coils are de-energized although compression springs 6 continue to act.

Figure 4:
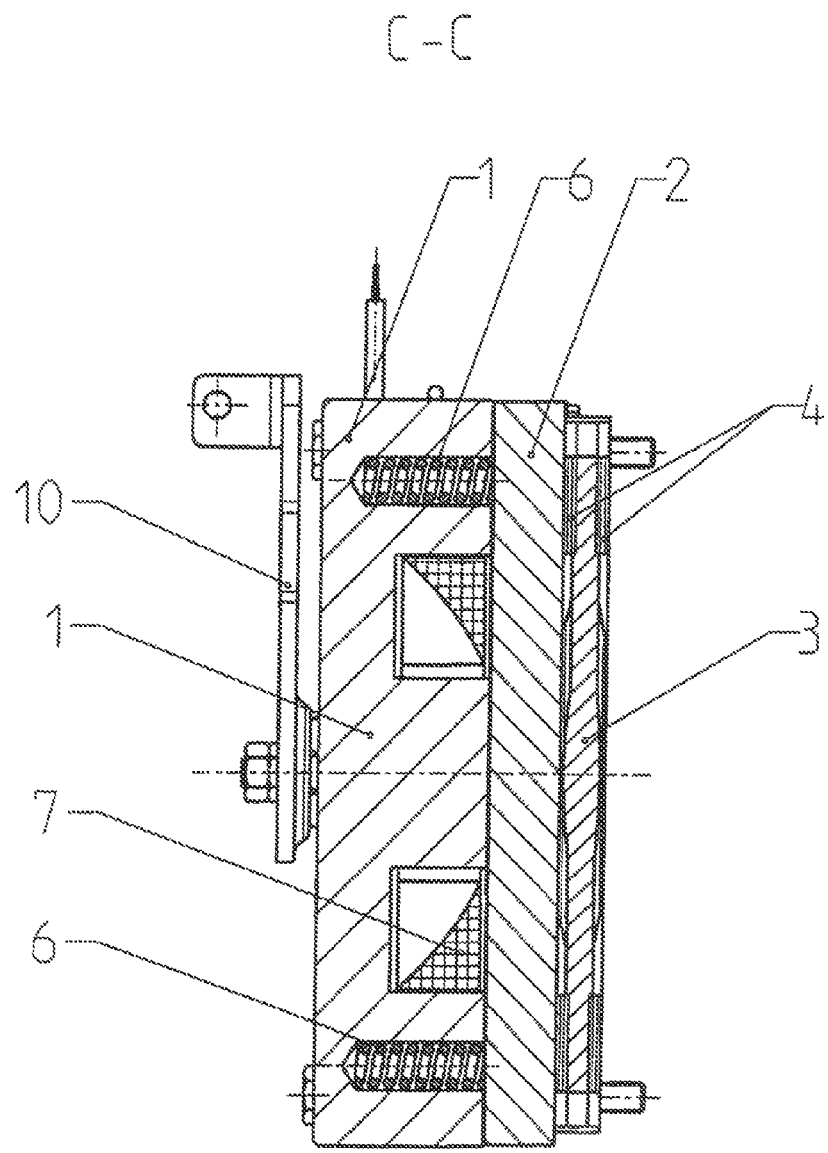
FIG. 4 is a section along line C-C in FIG. 2, showing the compression springs of the spring-pressure brake counteracting the magnetic force of the coils when these are energized.

FIG. 4 depicts the brake operation in greater detail. When coil 7 is energized, the resultant magnetic field attracts armature disk 2 across the air gap (not shown in greater detail) between coil support 1 and armature disk 2, and this against the force exerted by compression springs 6, which are accommodated inside coil support 1 and act upon armature disk 2. Thus, when the coils are energized, rotor 3 and its friction liners 4 are released and free to rotate.

Figure 5:
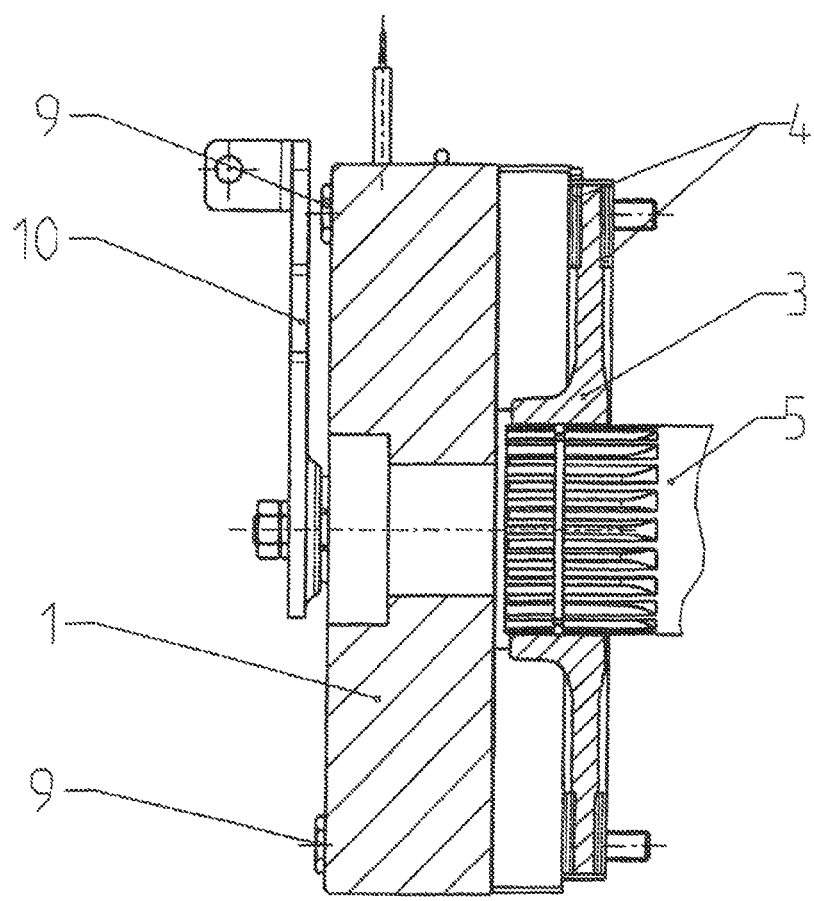
FIG. 5 is a section along line A-A in FIG. 2 showing the rotor and the splined hub mounting the rotor for axial movement.

FIG. 5 shows rotor 3, which is axially movable on splined hub 5. If the power is disconnected from coil 7 or 7.1 (see FIGS. 2 and 4), compression springs 6 cause both armature disks 2, 2.1 to be urged against friction liners 4 of rotor 3 and against the machine wall (not shown) so that rotor 3 will be slowed down. Friction liners 4 coupled with rotor 3 transmit the braking torque to splined hub 5 (FIG. 5) so that the braking torque can be transmitted in turn to a central shaft (not shown in FIG. 1) by means of the feather key groove in splined hub 5, for example.

As integral coil support 1 houses a pair of coils 7 and 7.1 and the associated pair of armature disks 2, 2.1 can be actuated separately; the resultant dual-circuit nature provides a redundant brake system comprising two separate brake sections. Should one of the coils fail or one of the armature disks seize or jam, the second or other brake section is still be available to provide 50% of the total torque.

Should the power fail completely, causing compression springs 6 to activate the brake and requiring manual release, if needed, manual levers 10, 10.1 are used to attract both armature disks against the pressure exerted by compression springs 3, thus releasing rotor 3 and its friction liners 4 for continued rotation. Alternatively, manual levers 10, 10.1 are adapted to be actuated separately.

As a result, there is described an electromagnetically releasing spring-pressure brake designed to be mounted on a machine wall or the like, said brake comprising a rectangular integral coil support 1 housing a pair of—preferably oval—coils 7, 7.1 disposed in an opposite neighbouring relationship on either side of the axis of rotor 3 with their coil axes in parallel, said coils having associated therewith a pair of separate rectangular armature disks 2, 2.1 which are urged by compression springs against a common rotor 3 having friction liners 4 attached to each face. Rotor 3 is axially movable on an axially splined hub 5. Near the four corners of rectangular coil support housing 1, four threaded fasteners 9 are placed adjacent the periphery of rotor 3 or friction liners 4, with each pair thereof forming a parallel mount for the armature disks 2, 2.1 at the radially largest possible diameter of rotor 3 by way of such pair of threaded fasteners associated with each armature disk extending through said armature disk symmetrically or centrally at the top and bottom extremities thereof (see FIG. 1). Each armature disk 2, 2.1 has associated therewith a manual lever 10 or 10.1, respectively, including a manual release bolt 11.

In comparison with a design comprising a pair of totally separate rectangular brakes with preferably oval coils in accordance with applicant's non-pre-published DE 10 2005 022 898 A, the invention described above provides an even simpler and inexpensive dual-circuit brake which enables the friction liners to be utilized more efficiently by way of an increased rotor diameter within the same external brake dimensions; alternatively, the external brake dimensions can be reduced with the rotor or the brake torque remaining the same. This is achieved by an integral rectangular coil support having therein a centrally disposed brake rotor and a pair of neighbouring—preferably oval—coils each associated with one of a pair of separate armature disks, said armature disks mounted centrally on a total of four parallel threaded fasteners 9 which also secure the coil support to a machine wall.

Summarizing, the present invention relates to an electromagnetically released spring-pressure brake adapted to be mounted on a machine wall or the like, said brake comprising an integral rectangular coil support 1 housing a pair of—preferably oval—neighbouring coils 7, 7.1 having a pair of separate movable rectangular armature disks 2, 2.1 associated therewith which, when coils 7, 7.1 are de-energized, exert pressure on a common central rotor 3 having a pair of friction liners 4 attached to each face thereof, said rotor 3 being axially movable on an axially splined hub 5. Pairs of threaded fasteners 9—from a total of four—are used for mounting and guiding each armature disk 2, 2.1 along the central longitudinal axes 13, 13.1 thereof at the radially largest possible diameter of rotor 3. Each armature disk 2, 2.1 has a manual lever 10 with a manual release bolt 11 associated therewith. The invention provides a simpler and less expensive brake comprising a dual-circuit feature which results in a better utilization of the friction liners by making possible a greater rotor diameter while keeping the external brake dimensions the same; alternatively, the external brake dimensions can be reduced when the rotor remains the same. This is obtained by an integral or unitary rectangular coil support housing a pair of neighbouring coils and a pair of separate and separately movable armature disks on either side of central brake rotor 3.

LIST OF REFERENCE CHARACTERS

1 coil support/coil support housing
2 armature disk, right
2.1 armature disk, left
3 rotor/brake rotor
4 friction liners
5 splined hub
6 compression springs
7 coil, right
7.1 coil, left
8 spacer sleeve
9 threaded fasteners
10 manual release lever, right
10.1 manual release lever, left
11 manual release bolt
12, 12.1 main axes of coils 7, 7.1
13, 13.1 central axes of 2, 2.1

The invention claimed is:

1. An electromagnetically releasing spring-pressure brake for mounting on a machine wall, said brake comprising a rectangularly or squarely configured coil support housing containing a pair of generally elliptical coils, each said coils having associated therewith one of a pair of elongated parallel armatures of rectangular configuration for exerting pressure onto a single side of a common central rotor to urge said rotor against the machine wall, said coils and said armatures positioned on opposite sides of an axis of rotation of said rotor, said rotor being axially movable on an axially splined hub, and two fasteners aligned on a central longitudinal axis of each armature for guiding movement of the associated armature, said fasteners being threaded for attaching the coil support housing to a machine wall and said fasteners positioned in said armatures at the largest possible distance from the axis of rotation of said rotor with each armature being mounted for axial movement on said fasteners to engage the brake rotor for decelerating said rotor or to engage the coil support housing for releasing the brake rotor.

2. The spring-pressure brake of claim 1, wherein only two of said fasteners are provided on the central longitudinal axis of each armature.

3. The spring-pressure brake of claim 2, wherein said fasteners are symmetrically positioned in each armature, and further including spacer sleeves on each fastener for guiding each armature, two of said spacer sleeves receiving braking torque from an associated armature.

4. The spring pressure brake of claim 3, wherein said rotor has a pair of friction liners on either side face of said rotor.

5. The spring-pressure brake of claim 4, wherein each armature has associated therewith a manual lever with a manual release bolt.

6. The spring pressure brake of claim 1, wherein said coil support housing is squarely configured.

7. The spring pressure brake of claim 6, wherein said rotor has a pair of friction liners on either side face of said rotor.

8. The spring-pressure brake of claim 1, wherein each armature has associated therewith a manual lever with a manual release bolt.

\* \* \* \* \*